United States Patent
Chang et al.

(10) Patent No.: US 7,044,625 B2
(45) Date of Patent: May 16, 2006

(54) LIGHT-EMITTING APPARATUS ABLE TO DYNAMICALLY PRODUCE LIGHTS OF DIFFERENT WAVELENGTHS

(75) Inventors: Che-Chih Chang, Taichung (TW); Chin-Kun Hsieh, Hsinchu (TW)

(73) Assignee: Au Optronics Corp, Hsinchu (TW)

( * ) Notice: Subject to any disclaimer, the term of this patent is extended or adjusted under 35 U.S.C. 154(b) by 59 days.

(21) Appl. No.: 10/462,630

(22) Filed: Jun. 17, 2003

(65) Prior Publication Data

US 2004/0001341 A1 Jan. 1, 2004

(30) Foreign Application Priority Data

Jun. 28, 2002 (TW) ................................ 091114416

(51) Int. Cl.
*F21V 13/14* (2006.01)
*F21V 9/16* (2006.01)
*F21V 17/06* (2006.01)

(52) U.S. Cl. ................. 362/601; 362/84; 362/224; 362/260; 362/282; 362/323; 362/608; 362/614

(58) Field of Classification Search .............. 362/84, 362/224, 260, 277, 280–284, 293, 319, 322–324, 362/561, 601, 606, 607, 608, 614; 349/61–65, 349/70, 71
See application file for complete search history.

(56) References Cited

U.S. PATENT DOCUMENTS

| | | | | |
|---|---|---|---|---|
| 1,460,644 A | * | 7/1923 | Dollison et al. | 362/280 |
| 2,010,307 A | * | 8/1935 | Leishman | 362/280 |
| 2,279,596 A | * | 4/1942 | Schipper | 362/84 |
| 2,346,988 A | * | 4/1944 | Noel | 362/281 |
| 3,208,174 A | * | 9/1965 | Wrenshall | 362/293 |
| 5,136,480 A | * | 8/1992 | Pristash et al. | 362/618 |
| 5,311,687 A | * | 5/1994 | Reed | 362/324 |
| 5,479,187 A | * | 12/1995 | Chen | 349/62 |
| 5,600,462 A | * | 2/1997 | Suzuki et al. | 349/62 |
| 5,855,428 A | * | 1/1999 | Wilkins | 362/293 |
| 6,144,424 A | * | 11/2000 | Okuda et al. | 349/65 |
| 6,454,440 B1 | * | 9/2002 | Yamamoto | 362/293 |
| 6,796,685 B1 | * | 9/2004 | Nemirow | 362/293 |
| 6,825,823 B1 | * | 11/2004 | Taira et al. | 349/65 |
| 6,873,311 B1 | * | 3/2005 | Yoshihara et al. | 345/87 |

* cited by examiner

*Primary Examiner*—Alan Cariaso
(74) *Attorney, Agent, or Firm*—Troxell Law Office, PLLC

(57) ABSTRACT

A light-emitting apparatus able to dynamically produce lights of different wavelengths comprises a light source, a lamp holder surrounding the light source and having a notch, and a light-transmitting structure surrounding the lamp holder, wherein the light-transmitting structure can rotate around the lamp holder and includes a first section through which only a light in a first wavelength range is sent out, and a second section through which only a light in a second wavelength range is sent out. The first section and the second section can be rotated in turn to face the notch of the lamp holder, following the rotation of the light-transmitting structure.

20 Claims, 5 Drawing Sheets

LIGHT-EMITTING APPARATUS ABLE TO DYNAMICALLY PRODUCE LIGHTS OF DIFFERENT WAVELENGTHS

FIELD OF THE INVENTION

The present invention relates to a light-emitting apparatus which can dynamically produce lights of different wavelengths, more particularly, to a light-emitting apparatus which can changeably produce lights of red, green and blue colors.

BACKGROUND OF THE INVENTION

Comparing with a traditional cathode ray tube (CRT), a liquid crystal display (LCD) has advantages of smaller size, lighter weight and low radiation ever since it was invented, and thus is popular. A schematic side view illustrating the major frame of a conventional LCD is shown in FIG. 1.

Referring to FIG. 1, the conventional LCD mainly comprises the following elements: an upper side polarizer 1, a color filter 2, an alignment layer 3, a spacer 4, a liquid crystal 5, a thin film transistor (TFT) array substrate 6, a lower side polarizer 7, a conductive paste 8, a frame sealant 9 and a TFT. The light necessary for the LCD to display images can enter into the LCD from a light guiding plate 11 below the lower side polarizer 7. An optical film (i.e. a light diffusion plate) 12 is between the lower side polarizer 7 and the light guiding plate 11, and a white sheet 13 is below the light guiding plate 11. A cold cathode fluorescent lamp (CCFL) is usually used in the conventional LCD as a light source 14 which is covered with a lamp holder 15. Since the light emitted by the CCFL is a white light intermingled with lights of various wavelengths, the color filter 2 is used to filter the emitted light when the light emitted by the CCFL enters into the LCD, such that the LCD can provide the function of color display.

In order to illustrate in detail how the LCD accomplishes color display, please refer to FIG. 1 again. The color filter 2 is composed by a plurality of red light filtering layers 2a through which merely a red light band is allowed to pass, a plurality of green light filtering layers 2b through which merely a green light band is allowed to pass and a plurality of blue light filtering layers 2c through which merely a blue light band is allowed to pass, wherein the red light filtering layers 2a, the green light filtering layers 2b and the blue light filtering layers 2c are arranged in turn, adjacent to one another, on the surface of the color filter 2, that is, the sequence thereof is a red light filtering layer 2a, a green light filtering layer 2b, a blue light filtering layer 2c, 2a, 2b, 2c, . . . .

After the light entering into the LCD is treated by the color filter 2, a red light, a green light and a blue light which go through any three sequentially arranged red light filtering layer 2a, green light filtering layer 2b, blue light filtering layer 2c on the color filter 2, respectively enter onto three pixels sequentially arranged on the LCD such that the three pixels display a red dot, a green dot and a blue dot respectively. Because the intensity of the dots on the aforesaid pixels can be controlled by the LCD, any three sequentially arranged pixels on the LCD are allowed by the conventional LCD via the above-mentioned principle to respectively display red dots, green dots and blue dots of different brightness, and to be formed as one display unit. Thus, each display unit can provide an effect of a color display in terms of a human's eyes. Therefore, the LCD having a plurality of display units may fulfill the function of displaying color pictures.

In manufacture of the above-mentioned LCD, a color filter is an indispensable element and accounts for a great proportion in material costs. Since the fabricating cost of the color filter is high, the manufacturing cost of the LCD cannot be greatly reduced. Furthermore, The resolution is restricted due to the fact that one display unit of the conventional LCD is composed by three sequentially arranged pixels. Hence, to resolve the above-mentioned problems is the goal of the manufacturers.

SUMMARY OF THE INVENTION

The primary objective of the present invention is to provide a light-emitting apparatus which can dynamically produce lights of different wavelengths and can be applied in the LCD manufacture to fabricate a LCD without the color filter element so as to greatly reduce the fabrication cost of the LCD.

The second objective of the present invention is to provide a light-emitting apparatus which can dynamically produce lights of different wavelengths and can be applied in the LCD in conjunction with the manner of time-sharing liquid control so as to improve the resolution of the LCD.

In a first embodiment of this invention, a light-emitting apparatus which can dynamically produce lights of different wavelengths comprises a light source, a lamp holder surrounding the light source and having a notch, and a light-transmitting structure surrounding the lamp holder, wherein the light-transmitting structure can rotate around the lamp holder and includes a first section through which only a light in a first wavelength range is sent out, and a second section through which only a light in a second wavelength range is sent out. The first wavelength range differs from the second wavelength range, and the first section and the second section can be rotated in turn to face the notch of the lamp holder, following the rotation of the light-transmitting structure.

Further, in a second embodiment of this invention, the light-emitting apparatus able to dynamically produce lights of different wavelengths comprises a light source, a lamp holder surrounding the light source and having a notch, and a light reflective structure beside the lamp holder, wherein the notch of the lamp holder is positioned between the light reflective structure and the light source, and the light reflective structure can rotate on its own axis and includes a first section which reflects only a light in a first wavelength range, and a second section which reflects only a light in a second wavelength range. The first section and the second section can be rotated in turn to face the notch of the lamp holder, following the rotation of the light reflective structure.

In addition, in a third embodiment of this invention, the light-emitting apparatus able to dynamically produce lights of different wavelengths comprises a light source, a lamp holder surrounding the light source and having a notch, and a light-transmitting structure beside the lamp holder, wherein the notch of the lamp holder is positioned between the light-transmitting structure and the light source, and the light-transmitting structure can rotate on it own axis and includes a light penetration section, a first section through which only a light in a first wavelength range is sent out, and a second section through which only a light in a second wavelength range is sent out. The first wavelength range differs from the second wavelength range, and the first section and the second section can be rotated in turn to face the notch of the lamp holder, following the rotation of the light-transmitting structure, wherein the first section (or the second section), the notch of the lamp holder and part of the light penetration section are just aligned when the first section (or the second section) is rotated to face the notch of the lamp holder.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The detailed description of a light-emitting apparatus which can dynamically produce lights of different wavelengths in the present invention, is given for illustration by the following three preferred embodiments.

Figure 1:
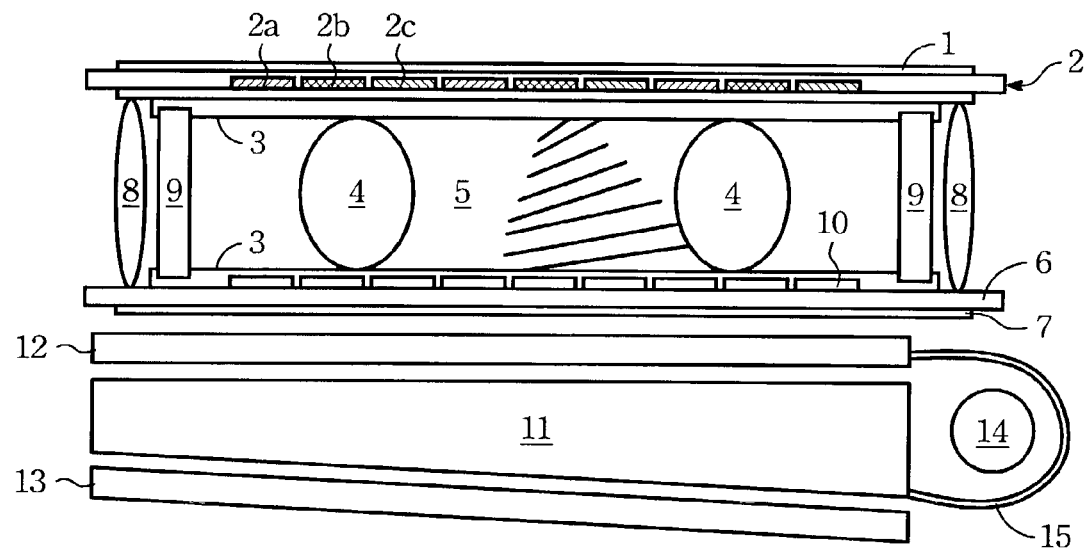
FIG. 1 is a schematic side view illustrating the major frame of a LCD is shown in the prior art.
Figure 2:
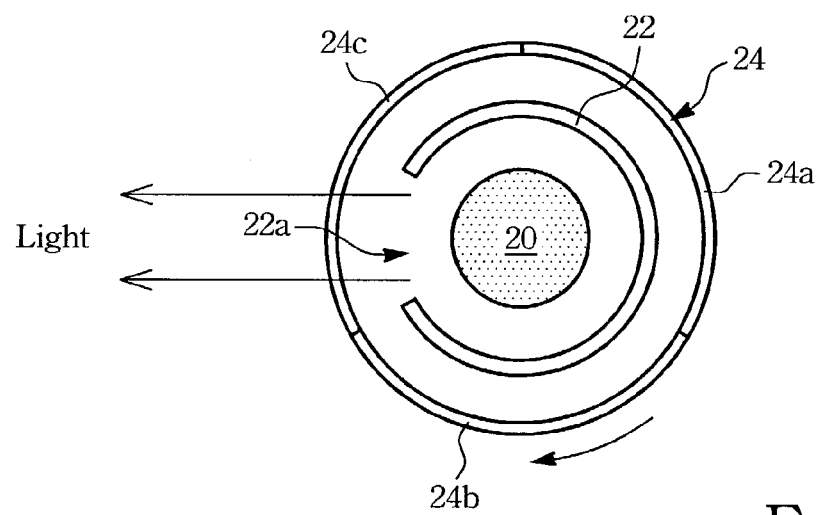
FIG. 2 is a side view of a schematic structural diagram of a light-emitting apparatus which can dynamically produce lights of different wavelengths in accordance with a first preferred embodiment of this invention.
Figure 5:
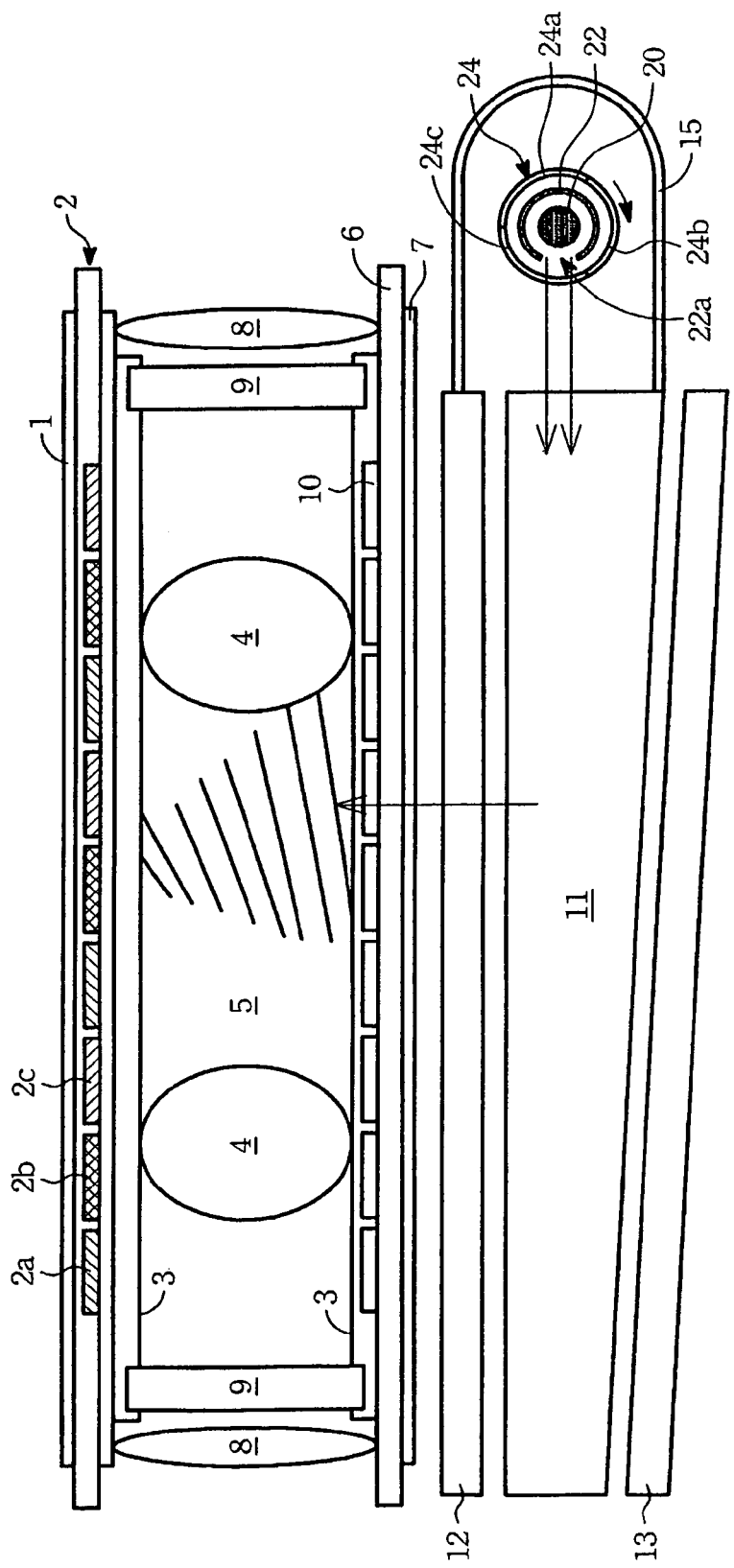
FIGS. 5–7 are schematic side views illustrating a major frame of a LCD of the present invention.

FIG. 2 is a side view of the schematic structural diagram of a light-emitting apparatus which can dynamically produce lights of different wavelengths in accordance with a first preferred embodiment of this invention. As shown in FIGS. 2 and 5, the light-emitting apparatus able to dynamically produce lights of different wavelengths comprises a light source 20, a lamp holder 22 surrounding the light source 20 and having a notch (or a transparent portion) 22a, and a rotative light-emitting structure 24 surrounding the lamp holder 22, wherein the rotative light-transmitting structure 24 can rotate around the lamp holder 22 and includes a first section 24a through which only a light in a first wavelength range is sent out, and a second section 24b through which only a light in a second wavelength range is sent out. The first wavelength range differs from the second wavelength range, and the first section 24a and the second section 24b can be rotated in turn to face the notch 22a of the lamp holder 22, following the rotation of the light-emitting structure 24. Alternatively, the lamp holder 22 may be directly coated on the light source 20.

Moreover, the light-transmitting structure 24 further includes a third section 24c through which only a light in a third wavelength range is sent out. The third wavelength range differs from the first wavelength range and the second wavelength range, and the third section 24c, the first section 24a and the second section 24b can be rotated in turn to face the notch 22a of the lamp holder 22, following the rotation of the light-transmitting structure 24.

The materials used in the first section 24a, the second section 24b and the third section 24c in the first embodiment of this invention are respectively materials which are able to absorb or reflect lights outside of the first wavelength range, materials which are able to absorb or reflect lights outside of the second wavelength range, and materials which are able to absorb or reflect lights outside of the third wavelength range. The first range of wavelength may be greater than 600 nm so that a red light can be sent out from the first section 24a; the second range of wavelength may be between 600 nm and 500 nm so that a green light can be sent out from the second section 24b; and the third range of wavelength may be below than 500 nm so that a blue light can be sent out from the third section 24c.

Figure 3:
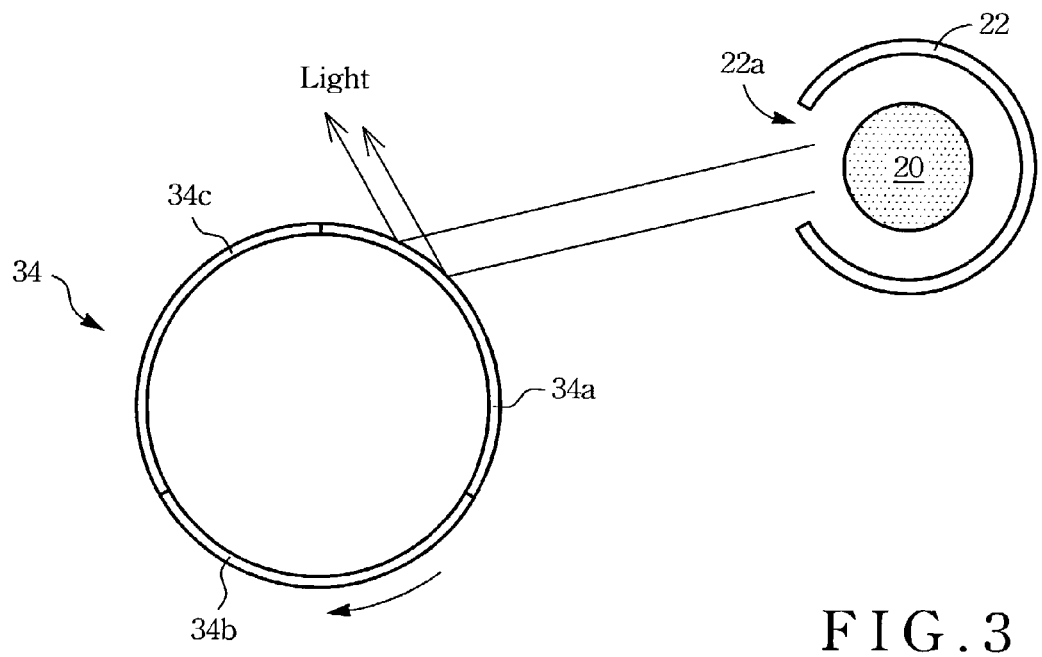
FIG. 3 is a side view of a schematic structural diagram of a light-emitting apparatus which can dynamically produce lights of different wavelengths in accordance with a second preferred embodiment of this invention.
Figure 6:
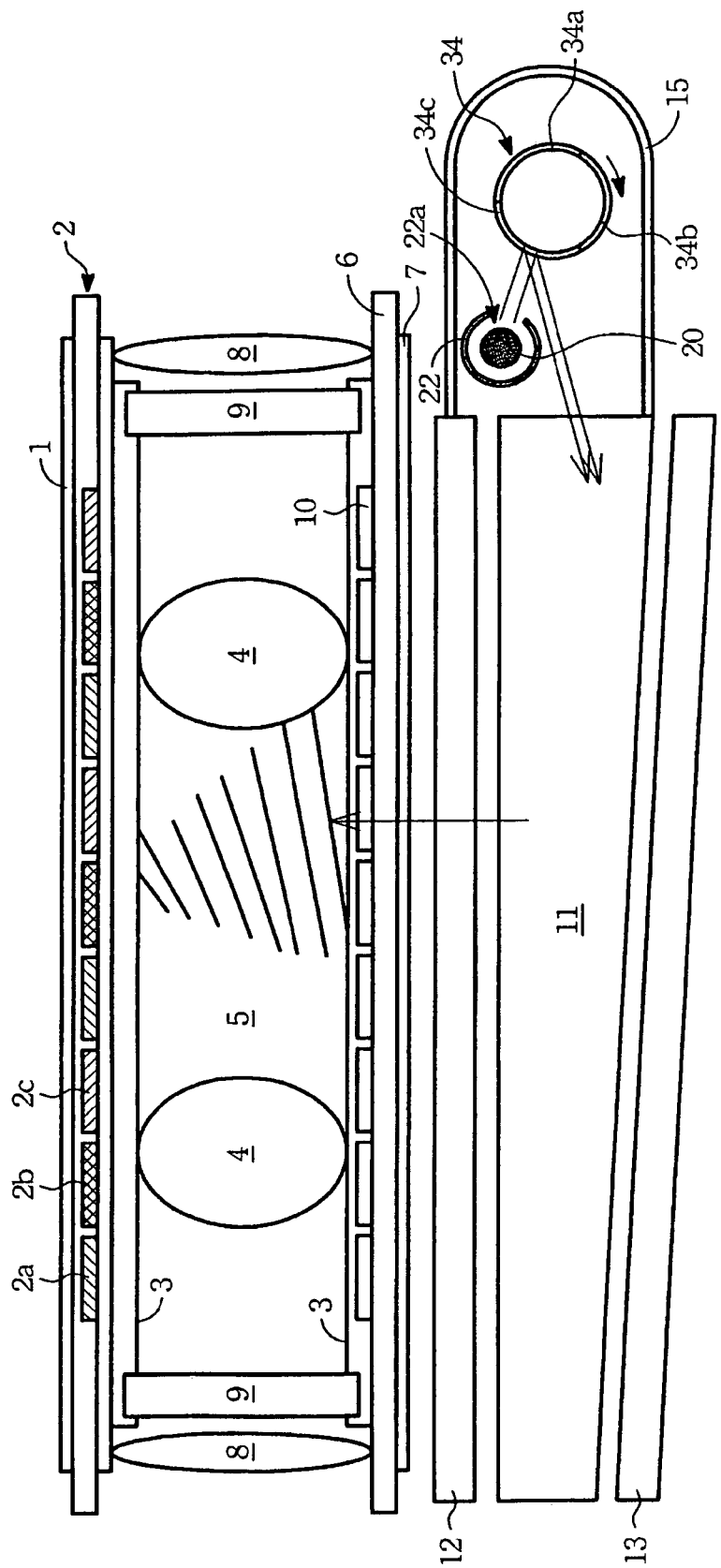

FIG. 3 is a side view of the schematic structural diagram of a light-emitting apparatus which can dynamically produce lights of different wavelengths in accordance with a second preferred embodiment of this invention. As shown in FIGS 3 and 6, the light-emitting apparatus able to dynamically produce lights of different wavelengths comprises a light source 20, a lamp holder 22 surrounding the light source 20 and having a notch 22a, and a light reflective structure 34 beside the lamp holder 22, wherein the notch 22a of the lamp holder 22 is positioned between the light reflective structure 34 and the light source 20, and the light reflective structure 34 can rotate on its own axis and includes a first section 34a which reflects only a light in a first wavelength range, and a second section 34b which reflects only a light in a second wavelength range. The first section 34a and the second section 34b can be rotated in turn to face the notch 22a of the lamp holder 22, following the rotation of the light reflective structure 34. Alternatively, the lamp holder 22 may be directly coated on the light source 20.

Moreover, the light reflective structure 34 further includes a third section 34c which reflects only a light in a third wavelength range. The third section 34c can be rotated to face the notch 22a of the lamp holder 22, following the rotation of the light reflective structure 34.

The materials used in the first section 34a, the second section 34b and the third section 34c in the second embodiment of this invention are respectively materials which are able to absorb lights outside of the first wavelength range, materials which are able to absorb lights outside of the second wavelength range, and materials which are able to absorb lights outside of the third wavelength range. The first range of wavelength may be greater than 600 nm so that the first section 34a can reflect a red light; the second range of wavelength may be between 600 nm and 500 nm so that the second section 34b can reflect a green light; and the third range of wavelength may be below than 500 nm so that the third section 34c can reflect a blue light.

Figure 4:
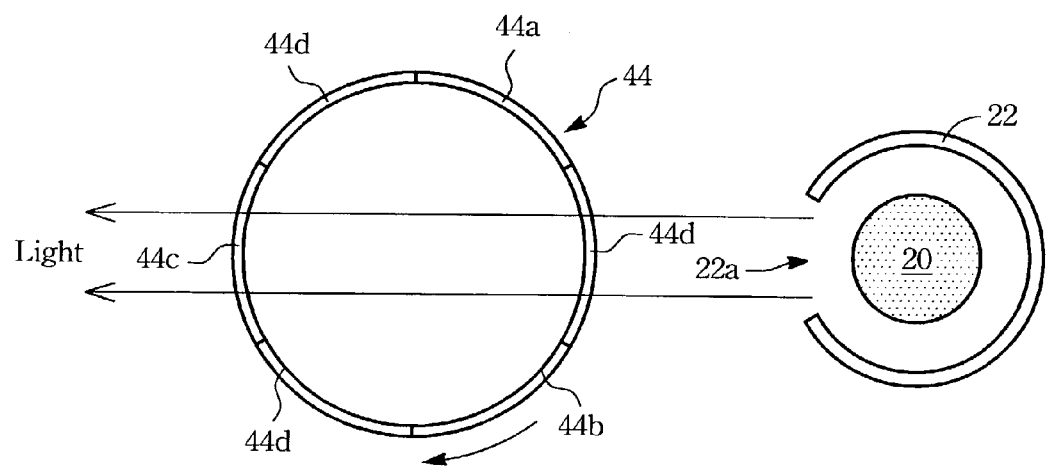
FIG. 4 is a side view of a schematic structural diagram of a light-emitting apparatus which can dynamically produce lights of different wavelengths in accordance with a third preferred embodiment of this invention.
Figure 7:
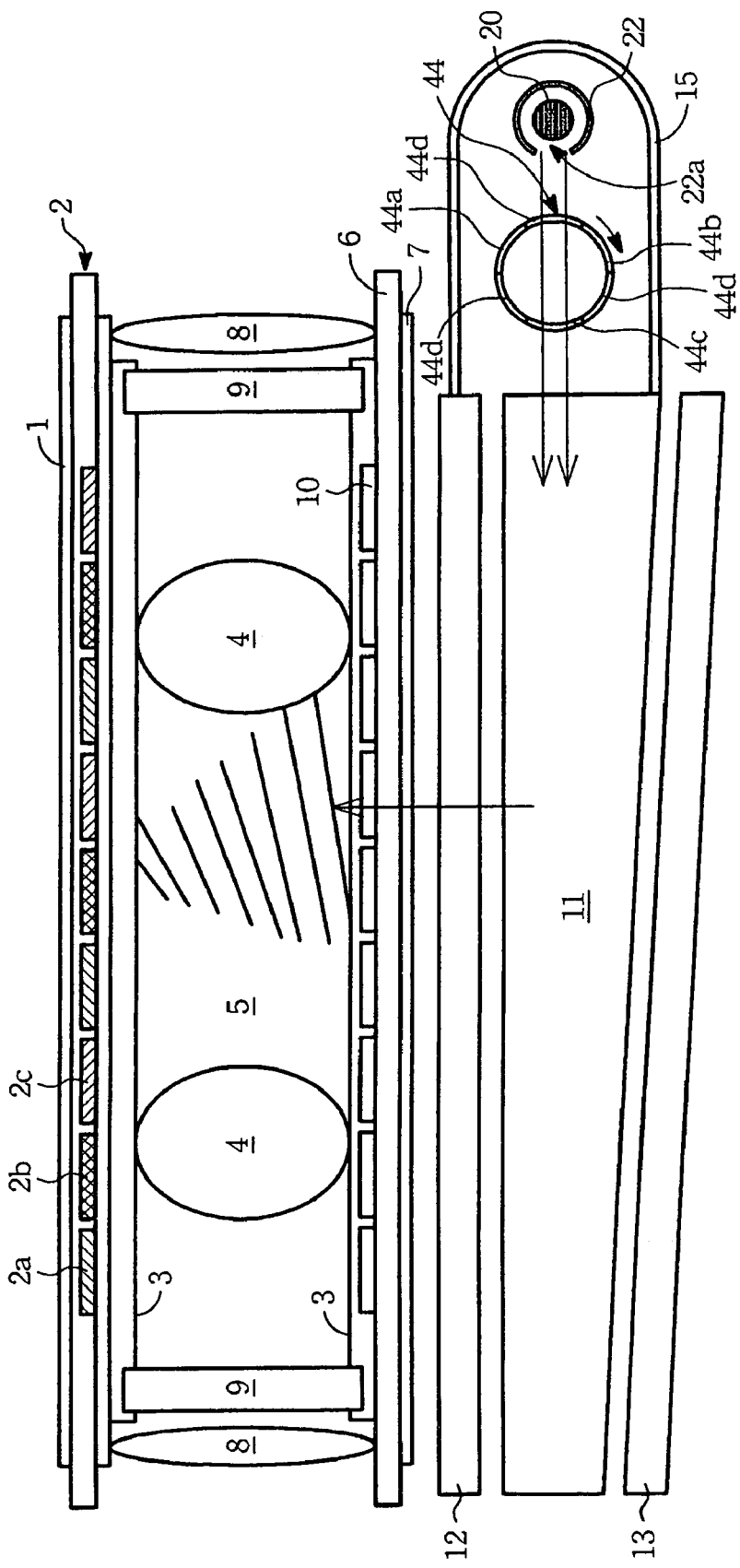

FIG. 4 is a side view of the schematic structural diagram of a light-emitting apparatus which can dynamically produce lights of different wavelengths in accordance with a third preferred embodiment of this invention. As shown in FIGS 4 and 7, the light-emitting apparatus able to dynamically produce lights of different wavelengths comprises a light source 20, a lamp holder 22 surrounding the light source 20 and having a notch 22a, and a light-transmitting structure 44 beside the lamp holder 22, wherein the notch 22a of the lamp holder 22 is positioned between the light-transmitting structure 44 and the light source 20, and the light-transmitting structure 44 can rotate on it own axis and includes a light penetration section 44d, a first section 44a through which only a light in a first wavelength range is sent out, and second section 44b through which only a light in a second wavelength range is sent out. Alternatively, the lamp holder 22 may be directly coated on the light source 20. The first wavelength range differs from the second wavelength range, and the first section 44a and the second section 44b can be rotated in turn to face the notch 22a of the lamp holder 22, following the rotation of the light-transmitting structure 44, wherein the first section 44a (or the second section 44b), the notch 22a of the lamp holder 22 and part of the light penetration section 44d are just aligned when the first section 44a (or the second section 44b) is rotated to face the notch 22a of the lamp holder 22.

Moreover, the light-transmitting structure 44 further includes a third section 44c through which only a light in a third wavelength range is sent out. The third wavelength range differs from the first wavelength range and the second wavelength range, and the third section 44c, the first section 44a and the second section 44b can be rotated in turn to face the notch 22a of the lamp holder 22, following the rotation of the light-transmitting structure 44, wherein the third section 44c, the notch 22a of the lamp holder 22 and part of the light penetration section 44d are just aligned when the third section 44c is rotated to face the notch 22a of the lamp holder 22.

The materials used in the first section 44a, the second section 44b and the third section 44c in the third embodiment of this invention are respectively materials which are able to absorb or reflect lights outside of the first wavelength range, materials which are able to absorb or reflect lights outside of the second wavelength range, and materials which are able to absorb or reflect lights outside of the third wavelength range. The first range of wavelength may be greater than 600 nm so that a red light can be sent out from the first section 44a; the second range of wavelength may be between 600 nm and 500 nm so that a green light can be sent out from the second section 44b; and the third range of wavelength may be below than 500 nm so that a blue light can be sent out from the third section 44c.

In the above-mentioned three embodiments of this invention, the lamp holder 22 can be a light reflector. Furthermore, the light source 20 can be a CCFL. Alternatively, the light source 20 can be a lamp without powders of fluorescence and the surfaces of the light-transmitting structures 24, 44 are printed with powders of fluorescence, and that of the light reflective structure 34 is composed by a reflective material (such as alumina) on which powders of fluorescence are printed.

In addition, in the above-mentioned three embodiments of this invention, the lights sent out from the light-emitting apparatus can be guided by a light guiding plate into a LCD (not shown). A time-sharing liquid crystal control is employed for the LCD to carry out the control of color modification, wherein the time-sharing liquid crystal control is to control the light-emitting apparatus such that the lights sent out from the light-emitting apparatus, in the first wavelength range, the second wavelength range and the third wavelength range are recurringly emitted, respectively with a rate of once per about $1/60$ seconds onto any one of pixels in the LCD. Hence, any one of pixels on the LCD can produce twenty color dots per second since one color dot is composed by the three sequentially produced dots, i.e. red dot, green dot and blue dot, and thus the LCD can display color images.

Therefore, the light-emitting apparatus able to dynamically produce lights of different wavelengths in this invention can be applied in the LCD to replace the conventional color filter element and to fabricate a LCD without the color filter element so as to greatly reduce the fabrication cost of the LCD. Moreover, a TFT gray scale control is used in the conventional LCD control and the color change thereof is conducted by one display unit which is composed by three pixels respectively show a red dot, a green dot and a blue dot. Although the conventional TFT gray scale control technique can also be used in this invention, only one pixel on which a red dot, a green dot and a blue dot are sequentially and recurringly displayed, is used to make up one display unit since the manner of the time-sharing liquid crystal control is employed in the LCD, so that the resolution of the LCD can be improved.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed:

1. A light-emitting apparatus dynamically producing lights of different wavelengths, comprising:
   a light source;
   a lamp holder surrounding said light source and having a notch; and
   a light-transmitting structure surrounding said lamp holder, rotating around said lamp holder and including a first section through which only a light in a first wavelength range is sent out and a second section through which only a light in a second wavelength range is sent out, wherein said first section and said second section are rotated in turn to face said notch, following the rotation of said light-transmitting structure;
   wherein the lights sent out from said light-emitting apparatus are guided by a light guiding plate into an LCD in which a time-sharing liquid crystal control is employed to carry out the control of color modification, wherein said time-sharing liquid crystal control is to control said light-emitting apparatus.

2. The light-emitting apparatus of claim 1, wherein said light source is a cold cathode fluorescent lamp (CCFL).

3. The light-emitting apparatus of claim 1, wherein said light source is a lamp without powders of fluorescence and the surface of said light-transmitting structure is printed with powders of fluorescence.

4. The light-emitting apparatus of claim 1, wherein said light-transmitting structure further includes a third section through which only a light in a third wavelength range is sent out, and said third section is rotated to face said notch.

5. The light-emitting apparatus of claim 1, wherein said first wavelength range is greater than 600 nm, said second wavelength range is between 600 nm and 500 nm, and a third wavelength range is less than 500 nm.

6. The light-emitting apparatus of claim 1, wherein said lights in said first wavelength range, said second wavelength range and said third wavelength range are recurrently emitted, respectively with a rate of once per about $1/60$ seconds onto any one of pixels in said LCD.

7. A light-emitting apparatus able to dynamically produce lights of different wavelengths, comprising:
   a light source;
   a lamp holder surrounding said light source and having a notch; and
   a light reflective structure beside said lamp holder of which said notch is positioned between said light reflective structure and said light source, rotating on its own axis and including a first section which reflects only a light in a first wavelength range and a second section which reflects only a light in a second wavelength range, wherein said first section and said second section are rotated in turn to face said notch, following the rotation of said light reflective structure;

wherein the lights sent out from said light-emitting apparatus are guided by a light guiding plate into an LCD in which a time-sharing liquid crystal control is employed to carry out the control of color modification, wherein said time-sharing liquid crystal control is to control said light-emitting apparatus.

8. The light-emitting apparatus of claim 7, wherein said light source is a cold cathode fluorescent lamp (CCFL).

9. The light-emitting apparatus of claim 7, wherein said light source is a lamp without powders of fluorescence and the surface of said light reflective structure is composed by a reflective material on which powders of fluorescence are printed.

10. The light-emitting apparatus of claim 7, wherein said reflective material includes a alumina.

11. The light-emitting apparatus of claim 7, wherein said light reflective structure further includes a third section which reflects only a light in a third wavelength range, and said third section is rotated to face said notch.

12. The light-emitting apparatus of claim 11, wherein said first wavelength range is greater than 600 nm, said second wavelength range is between 600 nm and 500 nm, and said third wavelength range is below than 500 nm.

13. The light-emitting apparatus of claim 7, wherein said lights in said first wavelength range, said second wavelength range and said third wavelength range are recurrently emitted, respectively with a rate of once per about 1/60 seconds onto any one of pixels in said LCD.

14. A light-emitting apparatus able to dynamically produce lights of different wavelengths, comprising:
 a light source;
 a lamp holder surrounding said light source and having a notch; and
 a light-transmitting structure beside said lamp holder of which said notch is positioned between a light-transmitting structure and said light source, rotating on its own axis and including a light penetration section, a first section through which only a light in a first wavelength range is sent out and a second section through which only a light in a second wavelength range is sent out, wherein said first section and said second section are rotated in turn to face said notch, following the rotation of said light-transmitting structure, and said first section, said notch of said lamp holder and part of said light penetration section are just aligned when said first section is rotated to face said notch;

wherein the lights sent out from said light-emitting apparatus are guided by a light guiding plate into an LCD in which a time-sharing liquid crystal control is employed to carry out the control of color modification, wherein said time-sharing liquid crystal control is to control said light-emitting apparatus.

15. The light-emitting apparatus of claim 14, wherein said second section, said notch of said lamp holder and part of said light penetration section are just aligned when said second section is rotated to face said notch.

16. The light-emitting apparatus of claim 14, wherein said light source is a cold cathode fluorescent lamp (CCFL).

17. The light-emitting apparatus of claim 14, wherein said light source is a lamp without powders of fluorescence and the surface of said light-transmitting structure is printed with powders of fluorescence.

18. The light-emitting apparatus of claim 14, wherein said light-transmitting structure further includes a third section through which only a light in a third wavelength range is sent out, and said third section, said notch of said lamp holder and part of said light penetration section are just aligned when said third section is rotated to face said notch.

19. The light-emitting apparatus of claim 18, wherein said first wavelength range is greater than 600 nm, said second wavelength range is between 600 nm and 500 nm, and said third wavelength range is below than 500 nm.

20. The light-emitting apparatus of claim 14, wherein said lights in said first wavelength range, said second wavelength range and said third wavelength range are recurrently emitted, respectively with a rate of once per about 1/60 seconds onto any one of pixels in said LCD.

* * * * *